United States Patent [19]

Crayson

[11] Patent Number: 4,783,841
[45] Date of Patent: Nov. 8, 1988

[54] DATA COMPRESSION

[75] Inventor: Paul G. Crayson, Cranham, United Kingdom

[73] Assignee: The General Electric Company p.l.c., London, United Kingdom

[21] Appl. No.: 45,493

[22] Filed: May 4, 1987

[30] Foreign Application Priority Data

May 8, 1986 [GB] United Kingdom ................. 8611179

[51] Int. Cl.⁴ .......................... G06K 9/00; G06K 9/68
[52] U.S. Cl. ........................................ 382/56; 382/37; 382/34; 358/263
[58] Field of Search .................. 382/27, 30, 33, 34, 382/37, 56; 358/263

[56] References Cited

U.S. PATENT DOCUMENTS

| | | | |
|---|---|---|---|
| 3,980,809 | 9/1976 | Cook | 358/263 |
| 4,222,076 | 9/1980 | Knowlton | 358/263 |
| 4,261,018 | 4/1981 | Knowlton | 358/263 |
| 4,281,312 | 7/1981 | Knudson | 382/27 |
| 4,499,499 | 2/1985 | Brickman et al. | 358/263 |
| 4,503,557 | 3/1985 | Maeda | 382/34 |
| 4,606,069 | 8/1986 | Johnsen | 382/56 |

Primary Examiner—Leo H. Boudreau
Assistant Examiner—Donald J. Daley
Attorney, Agent, or Firm—Spencer & Frank

[57] ABSTRACT

The present invention enables compression of digitized pictorial data to be achieved by comparing a data block of a predetermined size with a group of patterns relevant to that size held in a library. If a match is found the data block is represented by a code identifying the pattern on an output signal by a code identifying the pattern. If no match is found, the data block is sub-divided into smaller blocks which are compared with another group of patterns relating to the smaller block size. This sub-division process continues until the data is matched or a predetermined minimum size of data block is reached, in which case the data itself is applied to the output signal. The compressed data may be reconstituted and displayed or used to monitor the progress of a vehicle, for example.

23 Claims, 11 Drawing Sheets

DATA COMPRESSION

BACKGROUND OF THE INVENTION

This invention concerns data compression, and relates particularly, but not exclusively, to apparatus for compressing digital data derived from coloured pictures, especially maps.

It is usual to seek to store as much data as possible in the smallest space. This is especially true as regards pictures, particularly maps, when they are to be stored in digital form in association with some computerised retrieval and display system.

For various reasons it may be desirable to digitise a picture, such as a map of some area, by sampling what it shows in very small adjacent regularly spaced areas, or pixels, and converting what is seen in the sampled area into a number representing that area. The resultant stream of digits is then stored in some suitable way, for example as magnetic pulses on computer tape, disk or bubble, or as electrical charges in a computer semiconductor memory. This technique may be termed 'simple digitization.' At some later date the stored digital data may be retrieved and used to reconstitute the original picture, perhaps by controlling a colour plotter/pointer or a colour television display to show the picture. All of this is technically possible. The digitisation, storage, retrieval and display of map data is desirable in several fields. For example, in a moving vehicle, such as a car or an aeroplane, it is very convenient to have a display of the area through or over which the vehicle is passing. This allows the driver or pilot to see exactly where he is without needing to keep, and follow his progress over, a series of maps relating to the areas where he is likely to go. When a comuter is used to generate and control the display it is relatively easy to link the vehicle's movement with the map, so that the vehicle's position can be seen at a glance. However, there is a particular problem with map data, in that the data takes up a very large area of storage space. This presents difficulties both in storing and in rapidly retrieving and displaying any chosen area of map.

Various techniques for compressing pictorial data have been proposed. By compression of pictorial data it is meant that the picture is converted into a set of numbers taking up less storage space than is required for a simple digitisation. An indication of the degree of compression is given by the ratio of the simple digitisation size to the compressed data size and this is termed the compression factor. However the compression factors available with previous techniques are not always satisfactory. For example, one classic compression method is that referred to as "runlength" coding. Any map-like picture has parts that are the same over a large area. A strip or run of such a part can be stored, in coded form, as the length of the run, i.e. a number of small areas all of this one kind such as say, "15 blue" or "27 white". This takes up less room than storing each area separately. However, runlength coding can rarely give a compression factor much greater than about 5, but naturally this depends on the map and the frequency of features it depicts. Although this is useful nevertheless higher compression factors are very desirable.

SUMMARY OF THE INVENTION

According to a first aspect of this invention there is provided apparatus for compressing pictorial data comprising: means for accepting an input signal of data representing digital words, each describing a pixel of a picture; means for separating the pictorial data into blocks, each block representing an array of pixels consisting of rows and columns; a library containing groups of patterns, each group relating to a respective block size, and each pattern consisting of a block of data representing a pictorial feature and being associated with an identifying code containing fewer digits than the block size associated with its group, comparison means for comparing the content of each data block with patterns of the relevant group; and means which, if a match is found on comparison, causes the content of the data block to be represented in an output signal by the identifying code associated with the matched pattern whereby the pictorial data is compressed, and if no match is found, causes the data block to be separated into blocks of smaller size and the smaller blocks to be applied to the compression means. By employing this invention. for an average map it is possible to obtain a compression factor ranging from say, 5 up to as much as 20.

Apparatus in accordance with the invention may be employed with any pictorial data, that is, to a "picture" of any sort. For example. it could be used on a "picture" composed solely of text. However it is intended primarily for the storage of maps in digital form. The map is a good example of a simple picture with well-defined shapes, lines and colours all in limited numbers and can be of any variety, for example of a land area, a sea chart, or a map of an antenna's polar radiation pattern.

Since the pictorial data is digitised first in some suitable way it can therefore be easily handled by computer. Thus, the pictorial data is a digital representation of an actual picture, and is processed by apparatus in accordance with the invention to convert it into a compressed form that takes up considerably less storage space than the raw digital data resulting from simple digitisation. Hereinafter the use of digital data will generally be assumed, although for ease of understanding the operation of the apparatus will for the most part be desoribed as though it were related not to digital picture data but to the picture itself. Moreover, since the invention is intended primarily for the compression of data relating to a picture that is a map of some sort, the references hereinafter to the picture are for the most part and for convenience, references to a map.

By employing the invention, a series of numbers may be stored and, upon retrieval from storage, employed to construct a representation of the original data. The numbers may be in any digital format, but for computer use are conveniently binary, octal or hexadecimal. Each identifying code may identify several things in addition to the pattern type, such as the data block size, the colour(s) represented by digital words of a data block, and the actual data block content when, for example, no match may be found. The apparatus may be operated such that a picture, for example, such as a map, is examined data block by data block to provide an output signal comprising a string of numbers defining the contents of each data block. Upon retrieval and decoding for display these numbers are fed into a system that uses a library having the same contents as that used for compression of the digital data to re-constitute and position in the display the data block contents identified by each code. The system may be similar to any conventional system for re-constituting a picture from digital data.

Preferably, means are included for monitoring the size of the data blocks, and, when a data block of a predetermined minimum size is monitored, for causing it to be represented in the output signal by itself. Thus a lower limit may be set on data block size, below which any attempt at matching it with patterns in a relevant group would provide only a small degree of compression or none at all and which would require high 'overheads' in the form of additional groups or 'level-libraries' and operating data.

Preferably, the apparatus is arranged such that each data block is compared with each pattern in the relevant group in series. However, it may be convenient to include a plurality of comparators in the comparison means and apply a data block simultaneously to each of them for comparison with one or more respective patterns at each location. This may reduce the time required for the matching and comparison process to be carried out. This latter arrangement may be particularly useful where the data, once compressed, is immediately to be transmitted or used in some other real time application without previously being stored.

It may be convenient that the means for separating the pictorial data into blocks is arranged to separate it into blocks of equal size and when no match is found on comparison, that the data block to be separated is arranged to be separated into smaller blocks of the same size. Preferably, each data block represents a square array of pixels as this is a particularly convenient configuration to deal with.

According to a second aspect of this invention there is provided a method for compressing pictorial data comprising: dividing the pictorial data to be processed into data blocks of predetermined size, comparing the content of each data block with a library of patterns relevant to the data block size; and if, on comparison, the data block content is identified as one such pattern coding the block accordingly, and if no match is found for a particular data block, subdividing the block into a plurality of smaller blocks and attempting to match the content of each of the smaller blocks against another selection of relevant patterns, and continuing the process of subdivision until the blocks reach a predetermined minimum size, whereupon, if there is no match, the content of a block is coded directly in terms of its content.

A single pixel can be defined by either of two numbers. as either on (1) or off (0). That number is storable as a single binary digit or bit. To define the on/off state of a 2×2 block of 4 pixels needs 4 bits if the pixel state is coded directly, pixel by pixel, although 4 bits can represent any one of $2^4=16$ numbers. In the same way a 4×4 block of 16 pixels needs 16 bits (which can represent any one of $2^{16}=65536$ numbers), and an 8×8 block of 64 pixels needs 64 bits (which can represent any one of $2^{64}$ pixels—a very large number). A 16×16 block needs 256 bits, and a 32×32 block needs 1024 bits. The matter to be considered is whether, at any particular data block size, the number of bits required to identify the number of patterns at that particular data block size is less than the number of bits required to individually describe the pixels represented by the data block.

If a 32×32 block is likely to have one of, say, 64 simple patterns (32 vertical lines, 32 horizontal lines) then its contents can be coded by the pattern number, and 64 patterns can be coded in 6 bits, as opposed to 1024 (one for each pixel). If a 16×16 block is likely to have one of, say, 32 simple patterns (16 vertical, 16 horizontal lines) then it can be coded as one of 32 numbers (patterns)—and 32 can be coded in 5 bits, as opposed to 256 (one for each pixel). So, if a 32×32 block had to be coded as four separate 16 blocks, then (without any overheads) it would need four lots of 5 bits or 20 bits (as opposed to the 1024 of one per pixel). If an 8×8 block is likely to have one of say 512 patterns then it can be coded as one of 512 numbers—in 9 bits, as opposed to 64 bits (one per pixel). Thus, a 16×16 block made up of 4 8×8 blocks would need 4 lots of 9 bits or 36 bits (as opposed to the 256 of one per pixel). If, then, a 4×4 block is likely to have 512 patterns it can be coded as one of 512 numbers—in 9 bits, as opposed to 16 bits (one per pixel). Thus, an 8×8 block made up of 4 4×4 blocks would need four lots of 9 bits, or 36 bits (as opposed to the 64 of one per pixel). Finally, if a 2×2 block is likely to have 8 patterns it can be coded as one of 8 numbers—in 3 bits, as opposed to 4 bits (one per pixel). Thus, a 4×4 block made up of 4 2×2 blocks would need four lots of three bits, or 12 bits (as opposed to the 16 of one per pixel).

It will be apparent that the number of bits required to define the number of patterns at each data block size is always less than the number of bits used to defined explicitly the pixels in the block right down to blocks that are 4 by 4 pixels square. Thus that pattern coding is advantageous down to the 4×4 block level, but that below it is likely to be disadvantageous when overheads are taken into account.

Returning to the matter of data block size, as a general indication it may be said that the largest blocks should be small enough such that there is a good average chance say, 1 in 4 averaged out over the whole picture, that any one data block will contain a pattern that is one of a small number (perhaps 64 or so) of patterns at that level in the library. Of course, the block size depends greatly on the type of picture from which the data is taken, and the scale of this picture in terms of both the smallest feature size and the pixel size. In pixel terms, a block that is 32×32 pixels square presently seems quite satisfactory. On the same basis, the smallest blocks, could be 4×4 pixels square.

In accordance with the invention, each data block is compared to try to obtain a match between the contents of the block with one of a limited number of patterns held in a group of the library appropriate to the data block size. In order that there be only a limited number of relevant patterns they are restricted to fairly simple ones appropriate to the picture involved. For example. a 32×32 pixel segment (the preferred largest one mentioned hereinbefore) of a map might have as relevant patterns only vertical and horizontal lines one or two pixels wide (the map grid lines), so there would be only 32+32=64 possible patterns at the 32 level. However, an 8×8 block of a map might have many more line-type patterns, possibly as many as 500 or even 1000. In one particular collection of library pattern groups the numbers of patterns in each group might be as follows:

The 32 Level Library

These patterns consist of constant colour regions and vertical and horizontal grid lines one pixel wide. The patterns total 1 (constant colour)+32 (vertical grid lines)+32 (horizontal grid lines)=65. This does not include vertical and horizontal grid lines intersecting, which is not allowed in this library.

The 16 Level Library

This is similar to the 32 level library, having only constant colours and grid lines. This has a total of (1+16+16=) 33 patterns.

The 8 Level Library

This contains constant colour and grid lines giving (1+8+8=) 17 patterns. In addition there can be regions of two colours split by diagonal lines going from one side of the block to the other. There are eight ways a line can go from one pixel corner on the bottom to any pixel corner on the top, and nine positions on the bottom from which it can do this. This gives 72 vertical positions. But the colours can be reversed, giving 144 positions. As this can also occur horizontally, this gives 288 combinations in total. So the total number of patterns in the library is 305. More complex patterns could be stored in this library, but these require excessive storage space.

The 4 Level Library

This library contains constant colours and grid lines using (1+4+4=) 9 patterns. The patterns produced in the 8 library using diagonal lines can be repeated for this library, where there are 80 different patterns. Another way to produce patterns is to build them up from 2×2 arrays of coloured pixels inside the 4×4 array, giving an upper limit of 216 patterns. Some of these patterns may be repeated, but only an upper limit needs to be found for the moment. This gives a total of 305 patterns.

There are two important points which should be noted. Firstly, the type of pattern is, at all levels, appropriate to what is expected in the picture concerned. So a pattern library for map data compression will hold, at each level, patterns of the sort most commonly expected at that level in a map. Secondly, the patterns are "whole segment" patterns, and their complexity should be matched to the size of the data block. Even though the biggest storage savings can be made by matching at the highest levels, the patterns themselves have to be stored and accessed, and the number of patterns at those levels needs to be kept low for efficiency of operation. Various examples of suitable map shapes/patterns at different levels are shown in the accompanying drawings.

In accordance with the invention the content of each data block is if possible identified as one of the relevant patterns, and is so coded. The entire data block content is identified by the library pattern identifying code, and so stored, saving considerable storage space. The library pattern identifying code number also is preferably associated with a level code indicating to which level library the number relates. This level coding can be done directly, say by prefixing each pattern identifying code by a level coding defining absolutely the appropriat library. For example, if there are only libraries for levels 32, 16, 8 and 4 then—with only four levels—only 2 bits are required. It is preferred, however, to employ a relative coding system. wherein a 1 means "move down a level" and a 0 means "stay at this level", and to organise quite separately, in the retrieval, decoding and display equipment, a track of whether, having completed a set of data blocks within a larger data block the level should automatically be upped from that of the set to that of the larger data block. Starting at the 32 level of a 32, 16, 8 and 4 level system, the longest level code would be 1110, meaning "move down three levels, to the 4 level, and stay there". In a 32×32 data block or segment divided into four 16×16 segments the first two of which were themselves each divided into four 8×8 segments, and assuming the data is ordered so that in any set of four sub-segments the contents of any one is matched/sub-divided before the next is dealt with, the level codes would be as follows:

| 110 | meaning | down two (to 8) and stay |
|---|---|---|
| 0 | " | stay |
| 0 | " | stay |
| *0 | " | stay |
| 10 | " | down one (to 8) and stay |
| 0 | " | stay |
| 0 | " | stay |
| *0 | " | stay |
| 0 | " | stay |
| 0 | " | stay |

After finishing the * segments the equipment recognises that a set of four segments has been completed, and automatically increments the level. Thus to stay at the lower level the level code must include the "go down one" digit.

If the contents of a data block, where the data block or segment is not of the predetermined minimum size, cannot be identified with a library pattern, then the data block is separated into a number of smaller data blocks. In what has gone before it has been assumed that the sub-division will be by four into four like-sized and shaped quarters. This is convenient for a library system as each data block side is divided by a power of two, and the area is thus divided by four. While this is not essential, nevertheless it is very much the most convenient approach. Moreover, it is most preferable if each set of four smaller data blocks be dealt with in the same order—say, top left, top right, bottom left, bottom right—before moving on to the next larger data block. The level codes listed above are for such a sequence of smaller data blocks.

The sub-division and matching is continued until a predetermined minimum data block size is reached and in the example described above, this is at the 4×4 pixel level. If then no match is found between the content of the data block and the relevant level library then the block is coded explicitly in terms of its individual pixels that is, its actual contents. For a 4×4 pixel block this will require a 16-bit code. This assumes that the block pixels are coded in some systematic way or order, such as in left to right lines starting at the top line and working down to the bottom. This failure to match can conveniently be signalled by having a special pseudo-pattern code that causes the operating equipment to recognise that the following group of bits—16 for a 4×4 block—explicitly defines the pixels in the block rather than being, or starting with, a code representing some pattern of those pixels.

The invention thus enables compression of pictorial data to be carried out so that a very small fraction of the storage space is occupied compared to that which would be needed if the picture had been stored in simple digital form, pixel by pixel. The subsequent decoding of the output signal, which may have been stored for example, to reform the picture is in a sense the reverse. The operating equipment when fed with a stream of data must be able to decide which portions of this data tell it what and it must be told, or alternatively be able to determine for itself (i) at which size of data block it is working,
(ii) what the identifying code is, and
(iii) where the pattern is to be positioned.

Accordingly, there needs be fed to the system data, in the form of a stream of binary digits or bits if the equipment is essentially an electronic computer, that defines the level and the pattern thus: <level> <pattern> <position> <level> <pattern> <position> . . . <level> <pattern> <position> where <level> represents a group, or "field", of bits defining the present level, and <pattern> is a field that defines the pattern, either as the number of a library pattern or as an explicit pixel group.

The actual internal format of this data, that is, the way the level information is presented and the way the pattern information is presented, depends on many factors. Some of these can be appreciated from the following discussion, which relates to various specific, and possibly preferred, ways of arranging the information and the equipment that handles it. In this discussion it is assumed that the equipment is in a form that expects data to come in as a stream of bits, and, for the most part, that the levels related to blocks that are 32, 16, 8 or 4 bits square.

Level

As explained above, the level coding can be absolute, in the sense that every pattern identifying code is preceded by a level code that says explicitly to which level, 32, 16, 8 or 4, the shape relates. Alternatively, and preferably, the level coding is relative, in that it describes the level (size) of the next pattern relative to that of the preceding pattern. Moreover, it is preferred that the equipment be "intelligent" enough to recognize when it has dealt with all the next-level-down sub-segments in any segment so that it need only be told when (a) to stay at the same level or (b) to drop down a level. Preferably all level codes end with a "stay on this level" command. Furthermore, it is convenient to do all this with a variable length rather than a fixed-length level code field. With "0" for "stay" and "1" for "move down", the shortest the field can be is one bit (0, meaning "stay"), while the longest is four bits (1110, meaning "go down three levels [from 32 to 4], and stay there"). A purely mathematical average would be about 1.5 to 2 bits.

Pattern

The pattern coding relates to the number of some shape/pattern in a library of such patterns, and there is a different library for each level or size of block. Thus preferably the equipment needs to be able to access the correct library for the level presently being examined. The libraries at the different levels may well contain have different numbers of patterns. Thus, the 32 level library might have 64 patterns, the 16 level library 32 patterns, and the 8 and 4 levels libraries about 500 each. The pattern identifying code may be coded explicitly so that the pattern identifying code field can vary in length from level to level. The largest number of bits needed to define the 64 numbers 0 to 63 is 5 while the largest number of bits needed to define the 512 numbers 0 to 511 is 8. Alternatively, the pattern identifying code may itself be encoded so as on average to take up less space. One useable coding system is that known as a Huffman code, in which the further encoding is done on the basis of the frequency with which the material to be encoded is likely to turn up, the shortest Huffman codes being allocated to the most common item. Morse Code is an example of this principle, in that the most common letters hvve the shortest codes. E is the most common letter in English and is represented by a dot in Morse. The maximum length of a Huffman code in any system depends upon the number of items to be coded and their frequencies. On average, however, if there are n items then the longest Huffman code will require no more than $2\log_2 n$ bits. Of course, if a Huffman coding system is employed, or indeed, any coding system that allows the pattern field length to be variable within levels, then the equipment will need to be able to recognise, once a match has been found, that the following bits are the contents of the next following field.

The data stream representation given above includes a <position> field for clearly the equipment needs to know where, in the display as reconstituted so far, the next pattern is to be positioned. Clearly, this position information can be absolute, such as "place it with the segment left-hand top corner at the pixel position with X,Y-coordinates x and y", or it can be relative, such as "place it immediately to the right of the last segment". Moreover, in certain circumstances—such as when the equipment itself is designed to work in a certain sequence of segments (as mentioned previously), and knows where it is in this sequence—the position field may actually be empty, or absent, since the equipment has no choice but to move on to the correct next position.

Though no mention has yet been made of colour, the description of the invention so far has implied that what is being matched and coded are pure shapes in monochrome, that is, either in black on white, or in white on black. Most real pictures are in colour, since the use of colour allows complex information to be more easily transmitted to a viewer of the picture than if it were in black and white. There are a number of ways that the method of the invention could deal with colour, but the preferred is to analyse the picture or pictorial data in several different colours or strictly, colour planes in an analogous way as in colour printing where plates can be made up for the red, green and blue components of the original picture and then used to form three separate images overlapped on top of each other. Some printing is done in four colours (red, green, blue and black), but the best quality colour printing is done with more. Ordnance Survey maps are for example printed in 12 colours, including white, so for such a map the analysis is done in these same 12 colour planes. However, on the basis of the four colours red, green, blue and black the essential principle is that the pictorial data first be analysed for pattern content in one colour plane, such as the red plane, and that there be produced a set of "monochrome" pattern codes that are to be displayed in red, and similarly for the green, blue and black planes. When the data is retrieved, reconstituted and displayed, the first set of reconstituted patterns is shown in red, the second is overlayed on the first in green, the third is overlayed in blue, and the fourth is overlayed in black. Thus the whole four-colour picture is built up as four colour planes.

It is, of course, quite possible for the entire picture to be analysed in planes, so that the compressed data relates to the entire picture in one colour, the entire picture in the next colour and so on. It may be more convenient, however, to deal with the colour in individual segments. Then each segment is analysed in each of the colour planes, and all the data in each colour plane for each segment comes in the data stream after all the data for the previous segment and before all the data for the next segment. Moreover, in one preferred technique it is desirable to choose the largest segment into which the data is divided as the size of data block to be analysed in colour planes. The background colour for this segment may be considered as remaining the same all over it, only the foreground colour changing from one part to the next. Thus the patterns may be associated with a colour code field that identifies only the foreground colour, the last such field for any given segment then having a background colour code field added. A section of a data stream at the largest segment level only coded in this way might look like this <l> <s> [<p>] <f> <l> <s> [<p>] <f>
<b> where l=level, s=shape/pattern, p=position, f=foreground colour, and b=background colour. Of course, it will be apparent that here the position code is superfluous, for unless the foreground colour code is followed by a background colour code the next pattern and colour must be superimposed on the previous one.

It will also be understood that, since colour code data is only provided at the end of a largest segment level data batch, the data for the sub-segment levels within such a batch is not associated with any colour code field. The example given previously to show the idea of relative level coding might thus look like this as regards colour information for just one colour plane (the < > have been omitted here):

lslslslslslslslslslsf

Note that only at the end of the 32 level block is the foreground colour information given that applies to the whole of that block.

In accordance with the invention the contents of each data block are compared with a library of patterns relative to the segment or data block size. There are many ways in which this library can be formed and held. At one, rather absurd, extreme, for example, the library might be a physical one, in the form of actual pictures of the relevant patterns. The comparison process might then involve a digitisation of each such picture in turn, followed by a comparison with the digital contents presently under consideration. Preferably, however, the library is an electronic one, the patterns being stored in digital form. However even here there are various possibilities, for the library could be held on tape, on disk, in magnetic bubbles or, and most conveniently, in semiconductor memory. Moreover, while the semiconductor memory could be RAM (Random Access Memory), needing a preliminary loading with the relevant data whenever the equipment is switched on ready for use, most conveniently it is ROM (Read Only Memory), wherein the information has been permanently stored (even when power is removed) so that it is instantly ready for use at any time.

Though there may be other ways of holding each library pattern in store, it seems to be preferable to store a digitized shape as a steeam of digits (0s and 1s) explicitly defining the on/off state of all the pixels making up the relevant data block. Accordingly, the amount of storage required for the library patterns naturally depends upon the number of segment sizes and the number of pixels within each segment. Thus, using the 32, 16, 8, 4 level system referred to before, if at the 32 level (32×32=1024 pixels) there are 64 patterns then there must be provided storage space equivalent to at least 64×1024=65536 pixels, that is 65536 bits of data. In fact more will be needed, since in the preferred embodiments each pattern is to be associated with a code identifying the shape. Thus, every 32 level shape's 1024 pixels must carry an overhead. In one particular case this will be 20 bits, being a maximum of 16 for the Huffman code and a further 4 specifying the actual length of the Huffman code. In such an embodiment, then, a total storage equivalent to about 67000 bits is needed for the 32 level patterns. At the 16 level (16×16=256 pixels) there are 32 shapes, making 32×256=8192, and with overheads the total comes to around 8600. At the 8 and 4 levels (8×8=64 and 4×4=16 pixels respectively) there are, say, 512 shapes each, making 512×64=32768 and 512×16=8192 and with overheads the totals come to around 42000 and 16500 bits respectively. The library needs therefore to hold around 135000 bits, or roughly 17 kilobytes—which is relatively small.

The invention relates to apparatus for compressing pictorial data. Of course, once compressed in coded form, the data needs to be decoded for the purpose of viewing or reconstituting the pictures it represents.

This can involve little more that the reverse of the coding procedure. Thus, each chunk of coded data is analysed to determine both the defined size of the data block and the appropriate defined library pattern at that size. If there is such a pattern then its explicit description is retrieved from store while, if there is not, then the data is taken itself to be the required explicit description.

Most of the features relevant to this reconstitution process, and the equipment necessary to effect it, have already been discussed above, and need no further comment here. However, it is worth noting the following.

Firstly, while the compressed pictorial data can, like the library data, be stored in any form, nevertheless it is most convenient to hold it in ROM. A multiplicity of pictures can be held in several ROMs, which may be replacable either physically, by being removed from or inserted onto sockets on a printed circuit board, or electronically, be being all in place at once but switched into and out of use.

Secondly, rather than to decode and then construct a picture before the eyes of the viewer, it may be advantageous first to decode and assemble the complete picture in some temporary store, and then to copy out the contents of that store to the display unit. For example, it is possible, and convenient, when using a television-type VDU, to accept a frameful of coded data, decode that data, write the resultant picture into RAM, and then copy the contents of RAM to the VDU to produce the desired display. This technique has a number of advantages, including a considerable reduction in computing time in the decoding equipment, and in the problems associated with updating the picture as it changes as, for example, map data is amended to correspond to the movement of a vehicle across the displayed area. Further benefit can be derived by decoding and temporarily storing an area of picture considerably bigger than the area to be displayed, so that limited "movement" around the picture can occur without the need for any further decoding at all.

According to a feature of the invention, an arrangement for monitoring the position of a vehicle or object includes apparatus for reconstituting pictorial data compressed using apparatus in accordance with the invention, means for deriving information regarding movement of the vehicle or object, and means for comparing the derived information with reconstituted pictorial data. The vehicle or object's progress may thus be monitored, either on-board or at a remote location.

BRIEF DESCRIPTION OF THE DRAWINGS

The invention is now further described, by way of example, with reference to the accompanying drawings, in which:

FIGS. 3A, B, C and D show a VDU display of a digitised version of part of FIG. 2B (FIG. 3A is to the same scale as FIG. 2A; FIG. 3B is part of FIG. 3A but to the same scale as FIG. 2B, while FIGS. 3C and D are respectively smaller parts 4 times and 8 times enlarged thereover);

DESCRIPTION OF A PREFERRED EMBODIMENT

All the Figures depicting sections of Ordnance Survey maps were taken either from the map itself or from photographs of the map or of a display based upon a digitised version of the map. These were all originally in colour, but are here shown in black-and-white, with some hatching where it is desirable to show "colours".

Figure 1:
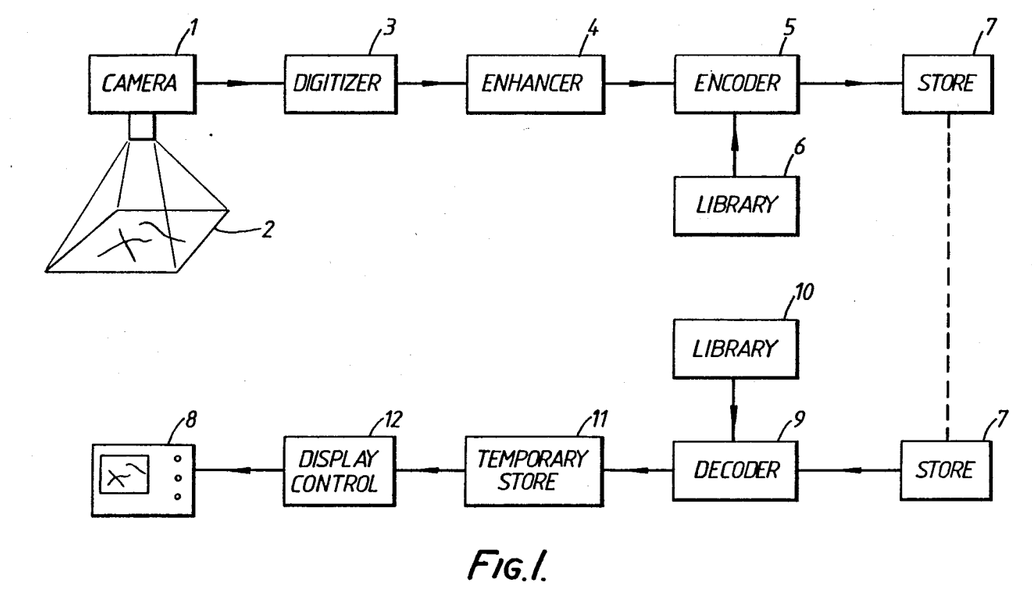
FIG. 1 shows in block diagram form the equipment required for carrying out the invention.

With reference to FIG. 1, equipment for carryinq out the invention includes a camera 1 arranged to view a map or picture 2, the information of which it is desired to store. The output of the camera 1 is applied to a digitiser 3 which converts the received analogue signal into a series of bits. The digitised signal is then transmitted via an enhancement circuit 4 to an encoder 5. The encoder compares the received signal representing the largest data block size of the map with the group of patterns held in a library 6 for that level, each pattern consisting of a block of data representing a pictorial feature. If no match is found for a particular block with a pattern in the group, then the block is sub-divided into a series of smaller blocks and the comparison process repeated with another group of patterns included in the smaller block size level in the library 6. When a match is found between segment or block and a pattern, an identifying code associated with the pattern is arranged to represent the contents of the block in an output signal. The output signal is transmitted to a store 7 where it is held until it is wished to retrieve it.

The bottom part of the diagram shown in FIG. 1 illustrates the retrieval process. The store 7 holds compressed data, which when reconstituted, results in a representation of the map 2 on a display device 8. A decoder 9 retrieves the stored data held at 7 and compares the identifying codes with information stored in a library 10, the contents of which are identical to the library 6 used during the encoding process. Thus by this comparison, the original digital data may be reconstituted and passed to a temporary store 11, where the data is stored until it is wished to display it at the display device 8. A display controller 12 synchronises the reading out of data from the temporary store 11 with the scanning of the display device 8 to reproduce the stored map 2.

In this embodiment, the display device 8 is carried on board a vehicle, the centre of the display representing the position of the vehicle. Information regarding the speed and direction of the vehicle is fed into the display controller 12 so that the map displayed changes as the vehicle moves. Thus the position of the vehicle may be monitored.

Figure 2A:
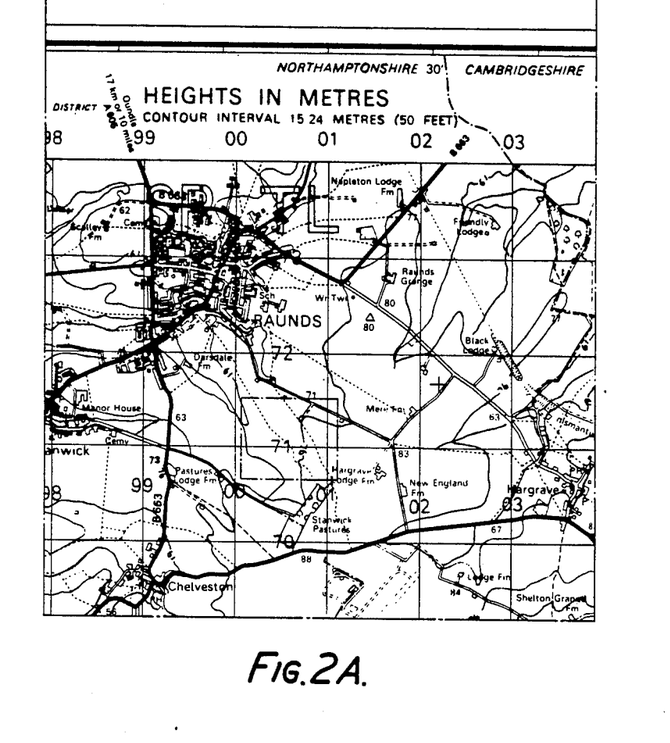
FIGS. 2A and B show portions of 1:50,000 Ordnance Survey Map No. 153 (FIG. 2B is about a 10 times enlarged version of part of FIG. 2A)

FIG. 2A shows a portion of 1:50,000 Ordnance Survey Map (Landranger series) No. 153 (Huntingdon and Bedford). A strip across the central section of this portion was digitised, including the area marked off by the square (around the grid northing Number 71), which area is shown considerably, but not very accurately, enlarged in FIG. 2B. The digitised version was cleaned up, introducing a number of minor, but not relevant, changes, and the data defining it was compressed employing apparatus in accordance with the invention.

Figure 2B:
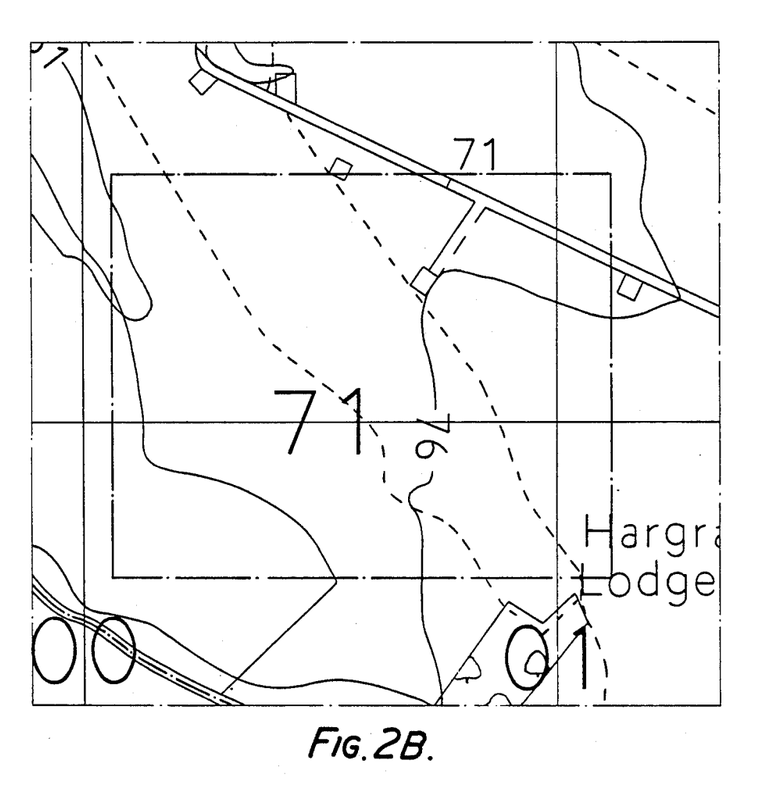
Figure 3A:
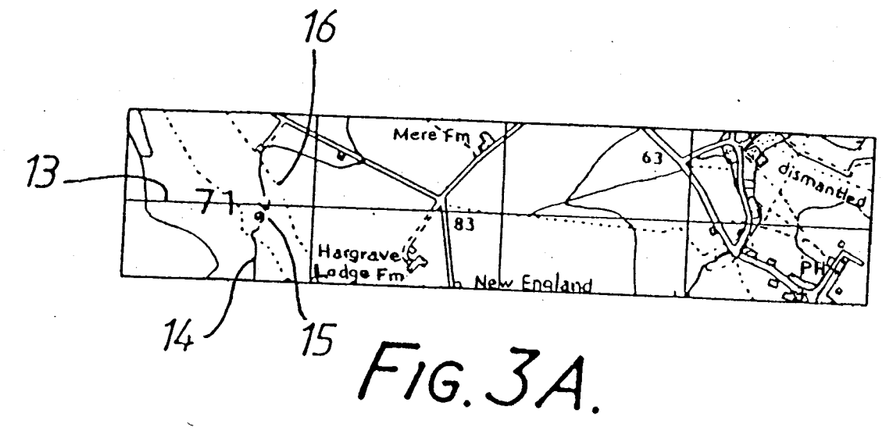
Figure 3B:
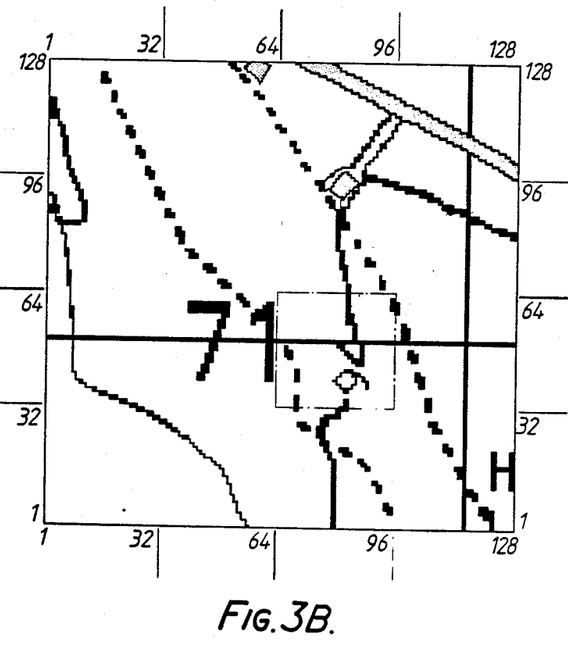

FIG. 3A shows a display generated from the digital data and represents a srrip of map that is 512 pixels long by 128 pixels deep. The squared area in FIG. 2A is at the left hand end of the strip, and some or all of the data defining this area (the area within the "71" square in FIGS. 2A and B) is shown, also as displayed on a conventional VDU, in FIGS. 3B, C and D. FIG. 3B shows the area at roughly the same scale as it is shown in FIG. 2B. At this scale the square was 128×128 pixels. Because this is quite a coarse resolution at the size, the individual pixels are beginning to show, giving smooth lines a fairly pronounced, jagged or tipped, edge.

Within the 128×128 pixels of FIG. 3B a smaller square, of 32×32 pixels, has been marked off. This smaller square is shown, enlarged, in FIG. 3C, and the coarsening of the resolution makes very obvious the formation of the features, for example the figure "76", from a collection of individual square pixels.

Figure 3C:
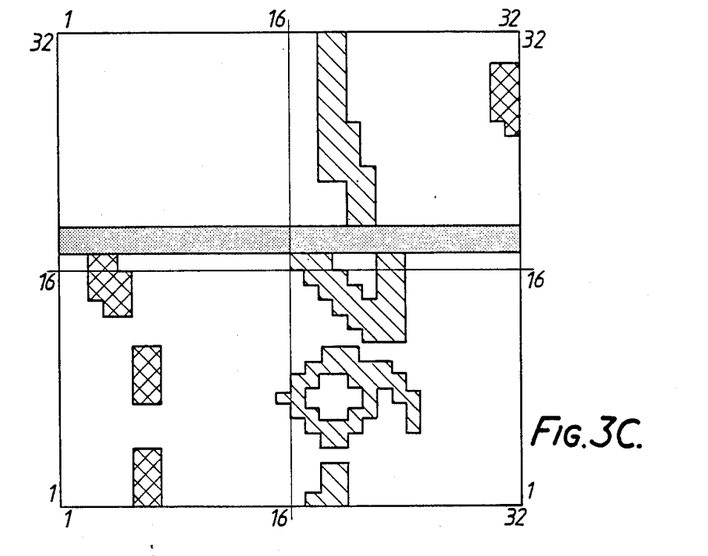
Figure 3D:
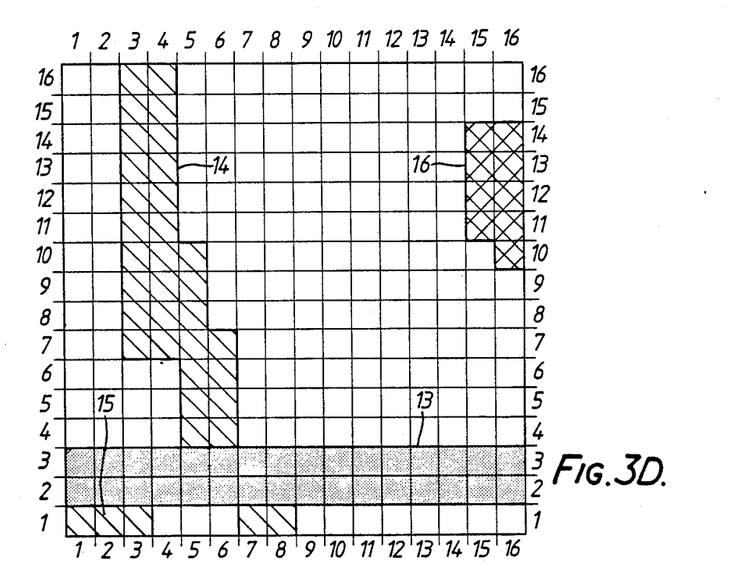

Finally, FIG. 3D shows, enlarged and coarsened yet again, the top right-hand quarter of FIG. 3C as viewed. Overlapping FIG. 3D is a grid that marks off and defines each one of the pixels that make up the 16×16 square Figure. Moreover, and see also FIG. 3A, to indicate the colours present in the "original" of this map portion, the grid line which was light blue is left grey, the contour line 14 and metric height 15 which were fawn are hatched, and the footpath 16 which was crimson is cross-hatched.

Figure 4A:
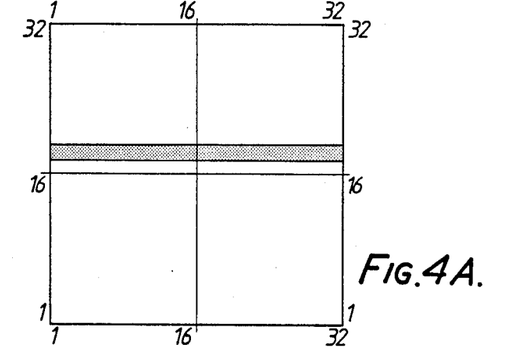
FIGS. 4A, B and C show, at a slightly reduced scale FIG. 3C split into its three colour planes.
Figure 4B:
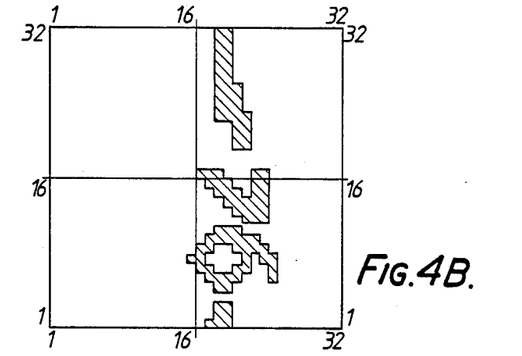
Figure 4C:
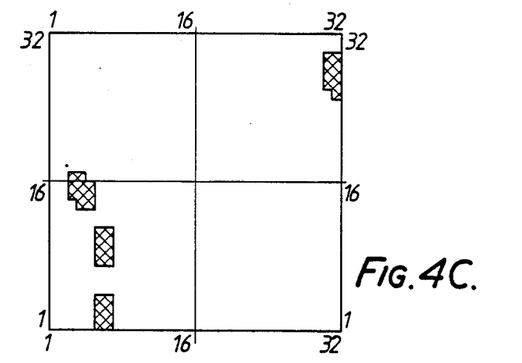

The sequence of FIGS. 4A, B and C shows at a slightly reduced scale the area of FIG. 3C separated into its three colour planes. These are: light blue (the grid line) in 4A; fawn (the contour line and height) in 4B; and crimson (the footpaths) in 4C. As is explained hereinafter, each colour plane at this, the 32 pixel level, is examined for pattern matching (and, if necessary, at the 16, 8 and 4 pixel levels) before the next colour plane is essayed.

Figure 5A:
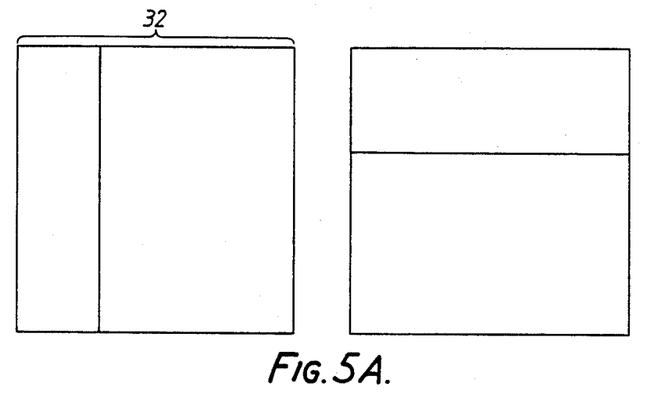
FIGS. 5A, B, C and D shows examples of library patterns at various different levels (segment sizes)

As explained previously, different library patterns are included for different levels or data block sizes, some of these being illustrated in FIGS. 5A, B, C and D. In the 32 level of a particular library, the group of patterns includes patterns which consist of constant colour, which may be background or foreground colour, and horizontal and vertical grid lines two pixels wide, as illustrated in FIG. 5A. There are 64 patterns in this library.

Figure 5B:
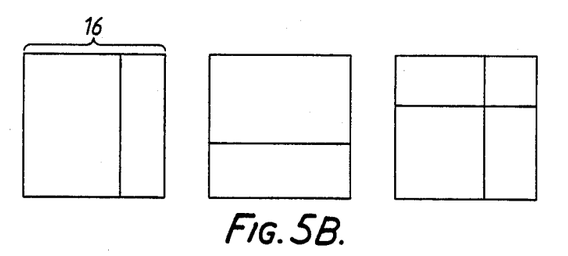

FIG. 5B illustrates some of the patterns contained in the 16 level library. In this particular library, the patterns included are constant foreground and background colours, vertical and horizontal grid lines two pixels wide, and all the combinations with each vertical grid line with each horizontal grid line, intersections between vertical and horizontal lines thus being included. This gives a total of 257 patterns in the 16 level library.

Figure 5C:
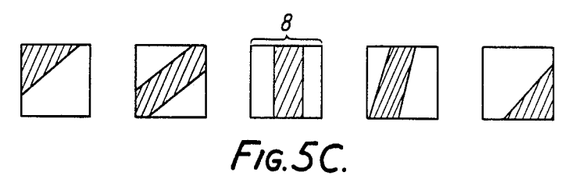

FIG. 5C illustrates some of the patterns included in the 8 level library. As is the 32 and 16 level libraries, the 8 level library includes patterns of constant foreground and background colour. Additional pattern types are also included which may be termed "regions" and "lines". The region pattern is one in which a diagonal line defines the boundary between a region of foreground colour and background colour, the line going from one side of the block to the other. The line may go from the bottom of a block to the top, or from one side to another in a generally horizontal direction. Line patterns are patterns consisting of straight and diagonal lines, from two to seven pixels wide, in a direction from left to right and top to bottom of the block.

Figure 5D:
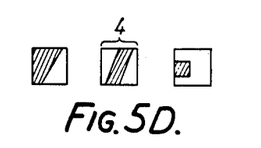

FIG. 5D illustrates some of the patterns included in the four level library. This library contains constant colours and grid lines, and also the region and line patterns included in the 8 level library. Other patterns which are included are ones which are of 2×2 blocks of constant colour, and patterns of constant colour and patterns which are as small as a single pixel wide. At this level. step sizes of half-pixel along a boundary between two colours are possible when the line defining the boundary goes from the mid-point between the corners of the block.

If once the four level library has been examined and a pattern has not been found in a library which can be identified as the image, the pattern is coded explicitly. A codeword is contained in the four level library which precedes the explicit 16 bit word in the coded image to identify the presence of the explicit word.

Figure 6A:
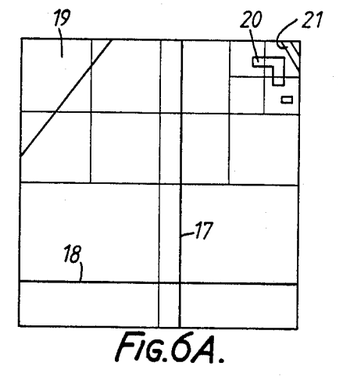
FIG. 6A shows a particular picture overlayed with a "grid" identifying the segments actually used to code it.
Figure 7A:
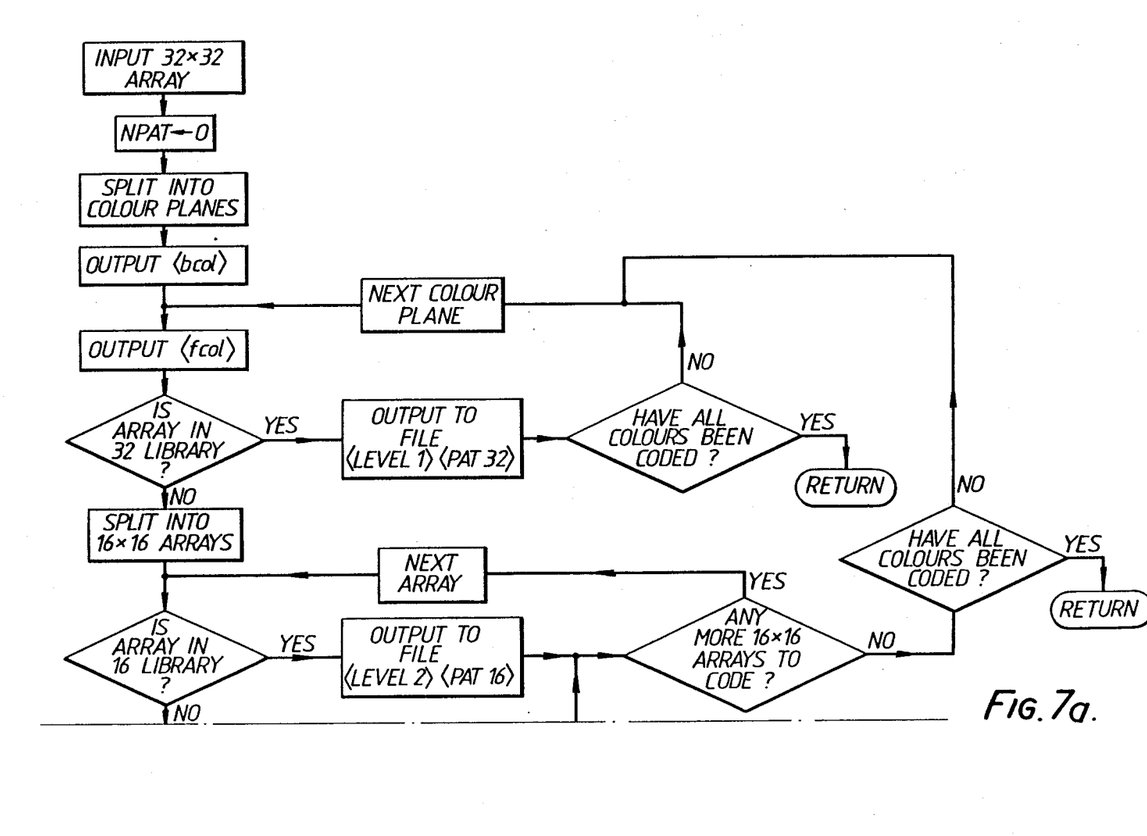
FIGS. 7A and B shows a flow chart in accordance with the invention and applicable to, say, the picture of FIG. 6A.
Figure 7B:
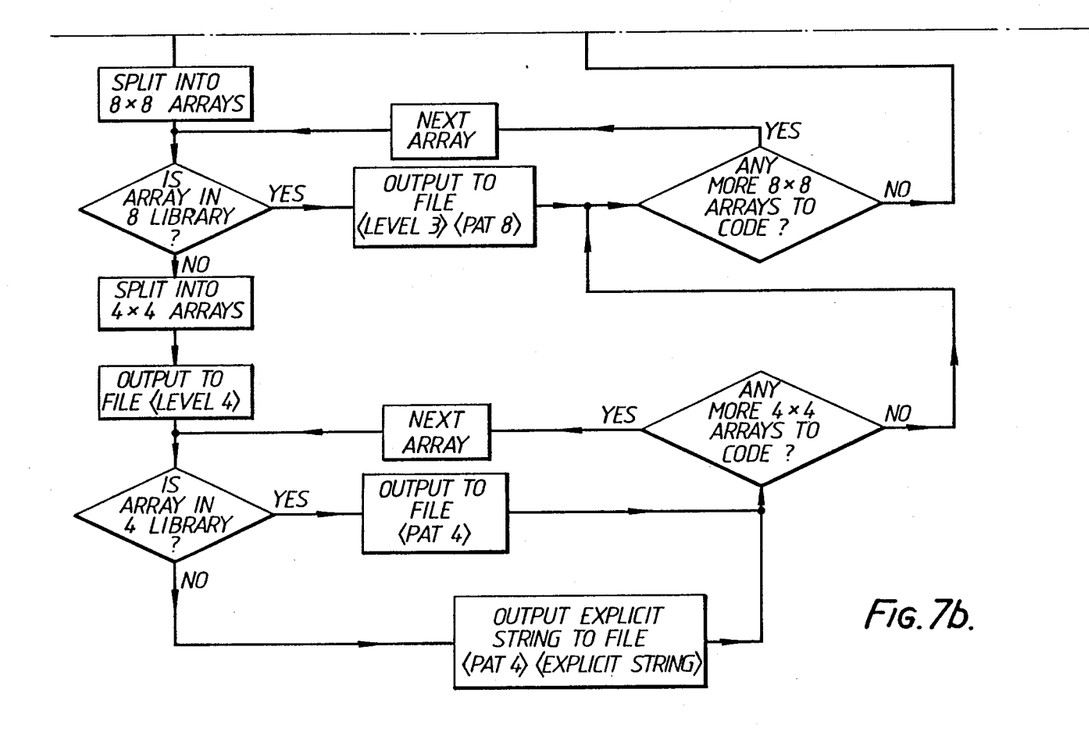

Data compression in accordance with the invention is now described further in relation to a map shown in FIG. 6A and the flow diagram of FIG. 7. The map shown in FIG. 6A includes various features within a 32×32 block under consideration. There are grid lines 17 and 18 which are blue, a lake 19 which is also blue, buildings 20 which are beige and a road 21 which is red.

Figure 6B:
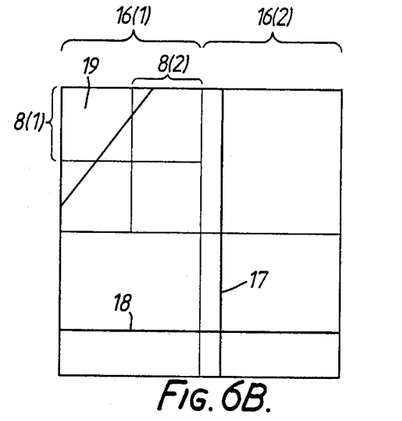
FIGS. 6B, C, D and E show the picture of FIG. 6A separated into different colour planes.

First of all, the digitised data representing the picture of the 32×32 array of pixels is input into an encoder. The encoder is initialised and then the data block is split into 4 colour planes, shown in FIGS. 6B, 6C, 6D and 6E and a code representing the background colour is output. The colour plane shown in FIG. 6B is considered first, and a code representing the first, foreground, colour plane to be examined is output. Then it is determined whether a pattern exists in the 32 library which can be matched with the 32×32 block. In this case it is not possible since the 32 library only includes horizontal or vertical lines or a plain colour. The block is then split into four 16×16 blocks and the top left-hand block, 16(1) is considered first. The 16 level library includes vertical lines, horizontal lines, vertical and horizontal lines, and constant colour. Thus in this case there is no match between the block 16(1) and the 16-level library.

The block is then further split into four 8×8 blocks and the top left-hand block 8(1) compared with patterns included in the 8-level library. This comparison results in a successful match and a code representing the level, level 3, and the pattern is output to a buffer store. The encoder then checks whether any more 8×8 blocks remain to be encoded, which in this case there are. The next block 8(2) which is the top right block is then considered. Again a match is found between the pattern of the block 8(2) and a pattern in the library and a further code defining the level and pattern is output. The two remaining 8×8 blocks in the top left quarter in the original 32×32 block are similarly considered, and matching patterns found in the library. Then, when no more 8×8 blocks remain to be coded, a check is made as to whether any 16×16 blocks remain. The top right hand 16×16 block, 16(2), is thus the next to be considered. The vertical pattern included io this block can be matched straight away with a pattern in the 16-level library and a code is generated indicating the level and the pattern code which is output to the file. The remaining two 16×16 blocks are similarly encoded. A check is made as to whether all four colour planes have been considered. Since this is the first colour plane, the process continues.

Figure 6C:
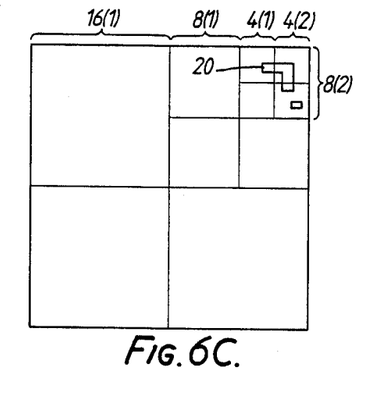
Figure 6D:
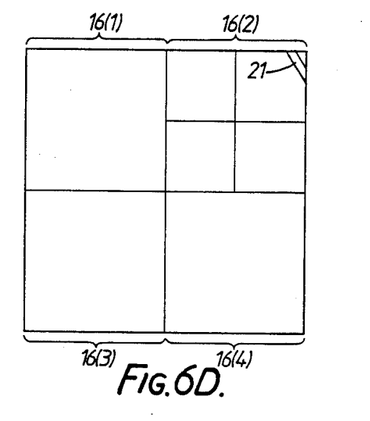

The second colour plane. including the features shown in FIG. 6C, is similarly dealt with. Firstly, the code representing the colour is output to the file. Then the 32×32 block is compared with patterns in the 32-level library. No match is found and thus the block is split into four 16×16 blocks. The first 16×16 , 16(1) of FIG. 6C, is considered and since it comprises a constant background colour, a match is found and a code representing the level and pattern transmitted to the buffer store.

The next 16×16 block to be considered cannot be matched with a pattern in the 16-level library and so is split into four 8×8 blocks. The first block, 8(1), is a constant background colour and thus can be matched with a pattern in the library. The next 8×8 block, 8(2), cannot be matched and thus a further sub-division is necessary, resulting in four 4×4 blocks. A code is output into the buffer representing level four and then the first top left-hand 4×4 block, 4(1), is compared with the patterns held in the four level library. A match is found and the correct pattern code is passed to the buffer store. The next 4×4 block to be considered, block 4(2), cannot be matched with a pattern in the four level library. A pattern code representing the use of an explicit word is generated and then the 16 bits of the block are explicitly coded and passed to the buffer store. The further 4×4 blocks are patterns which are included in the four level library and the use of an explicit word is not required. The remaining two 8×8 blocks are then considered and can be matched at the eight level stage. The two 16×16 blocks, 16(3), and 16(4), may be matched with patterns included in the 16 level library. A code is then added indicating the foreground colour.

Figure 6E:
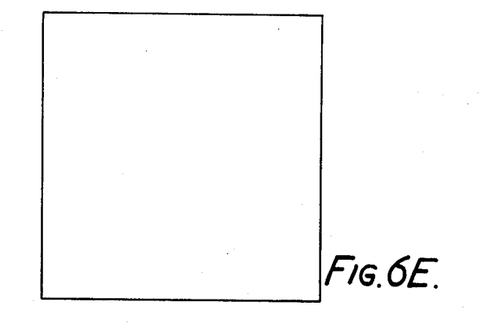

The third colour plane to be coded, shown in FIG. 6D, again cannot be matched at the 32×32 block level and thus is divided into four 16×16 blocks. The first 16×16 block, 16(1), is constant colour and can thus be matched. However, the second 16×16 block, 16(2), cannot be matched with a pattern in the 16 level library, and is thus divided into four 8×8 blocks. These may be matched with patterns in the eight level library. The remaining 16×16 blocks, 16(3) and 16(4) may be encoded at the 16-level stage. Again a code is then added defining the foreground colour.

colour plane to be considered. illustrated in FIG. 6E, is of background colour only but cannot be matched at the 32×32 block stage since this is not a pattern held in the 32 level library. Thus matching occurs after a division of the blocks into 16×16 blocks. Thus a code representing level 2 and the appropriate pattern is added and passed to the file. This completes the encoding procedure.

In the system illustrated with respect to FIGS. 6 and 7, there is no necessity to include a code defining the position of a particular block within the largest segment, since a count is kept as each block is encoded. The level codes in this particular embodiment are absolute, but they may be, as discussed previously, ones which represent either "go down a level" or "stay at this level".

I claim:

1. Apparatus for compressing pictorial data comprising: means arranged to accept an input signal of data representing digital words, each word describing a pixel of a picture; means arranged to separate the pictorial data into blocks, each data block representing an array of pixels; a library containing groups of patterns, each group relating to a respective block size and each pattern consisting of a block of data representing a pictorial feature and being associated with an identifying code containing fewer digits than the block size associated with its group; comparison means arranged to compare the content of each data block with patterns of the relevant group and means which, if a match between a data block and a pattern is found on comparison, causes the content of said data block to be represented in an output signal by said identifying code associated with the matched pattern whereby the pictorial data is compressed, and, if no match is found, causes said data block to be separated into blocks of smaller size and said smaller blocks to be applied to said comparison means.

2. Apparatus as claimed in claim 1 and including means arranged to monitor the size of said data blocks, and, when a data block of a predetermined minimum size is monitored, for causing it to be represented in the output signal by itself.

3. Apparatus as claimed in claim 1, and wherein each data block is compared in series with each of the patterns in the relevant group.

4. Apparatus as claimed in claim 1, and wherein the said pictorial data is separated into data blocks of the same size.

5. Apparatus as claimed in claim 1, wherein, when said data block is separated into blocks of smaller size, said blocks of smaller size are of the same size.

6. Apparatus as claimed in claim 1, wherein each data block represents a square array of pixels.

7. Apparatus as claimed in claim 1, wherein comparison and sub-division are arranged to be carried out in a predetermined sequence, and including means arranged to determine, by the size of a data block, the position of an array of pixels represented by said data block.

8. Apparatus as claimed in claim 1, wherein said identifying code is associated with a code identifying the data block size.

9. Apparatus as claimed in claim 8, wherein said code identifying the data block size is a relative code.

10. Apparatus as claimed in claim 1, wherein said identifying code is encoded using a Huffman code.

11. Apparatus as claimed in claim 1 and including means for separating the pictorial data into a plurality of colour planes.

12. Apparatus as claimed in claim 1 and wherein the patterns of one group are different from those of another group.

13. Apparatus as claimed in claim 1, including a store arranged to store the output signal 14. Apparatus for reconstituting pictorial data compressed using apparatus as claimed in claim 1 and including a library having the same contents as said library included in the apparatus for compressing the data.

15. Apparatus as claimed in claim 14 and including a store arranged to store reconstituted pictorial data.

16. Apparatus as claimed in claim 14 and including display means for visually displaying reconstituted pictorial data.

17. Apparatus as claimed in claim 16 wherein reconstituted pictorial data representing a picture to be displayed is arranged to be held as a whole in a store prior to being applied to said display means.

18. Apparatus as claimed in claim 17, wherein reconstituted pictorial data representing a region adjacent said picture to be displayed is arranged to be held in said store.

19. An arrangement for monitoring the position of a vehicle or object including apparatus as claimed in claim 14, means arranged to derive information regarding movement of said vehicle or object, and means for comparing derived information with reconstituted pictorial data.

20. A method of compressing pictorial data comprising: separating said pictorial data to be processed into data blocks of predetermined size, and comparing the content of each data block with a library of patterns relevant to the size of said data block; if said data block is identified as one such pattern, coding it accordingly, and if it is not so identified, sub-dividing said data block into smaller data blocks, the content of each of which is compared with patterns relevant to its size, and continuing subdividing data blocks until a predetermined minimum data block size is reached, whereupon the content of any data block that cannot be so identified is instead identified and coded directly in terms of said content itself.

21. A method as claimed in claim 20, wherein the position of an array of pixels represented by a data block relative to other arrays is determined by carrying out the matching and subdivision in a predetermined sequence and noting the data block size.

22. A method as claimed in claim 20 and in which, when a data block is subdivided into a plurality of smaller data blocks, the subdivision is by four into four similar size data blocks.

23. A method as claimed in claim 20, wherein the code identifying the pattern is itself encoded.

* * * * *